Patented May 27, 1947

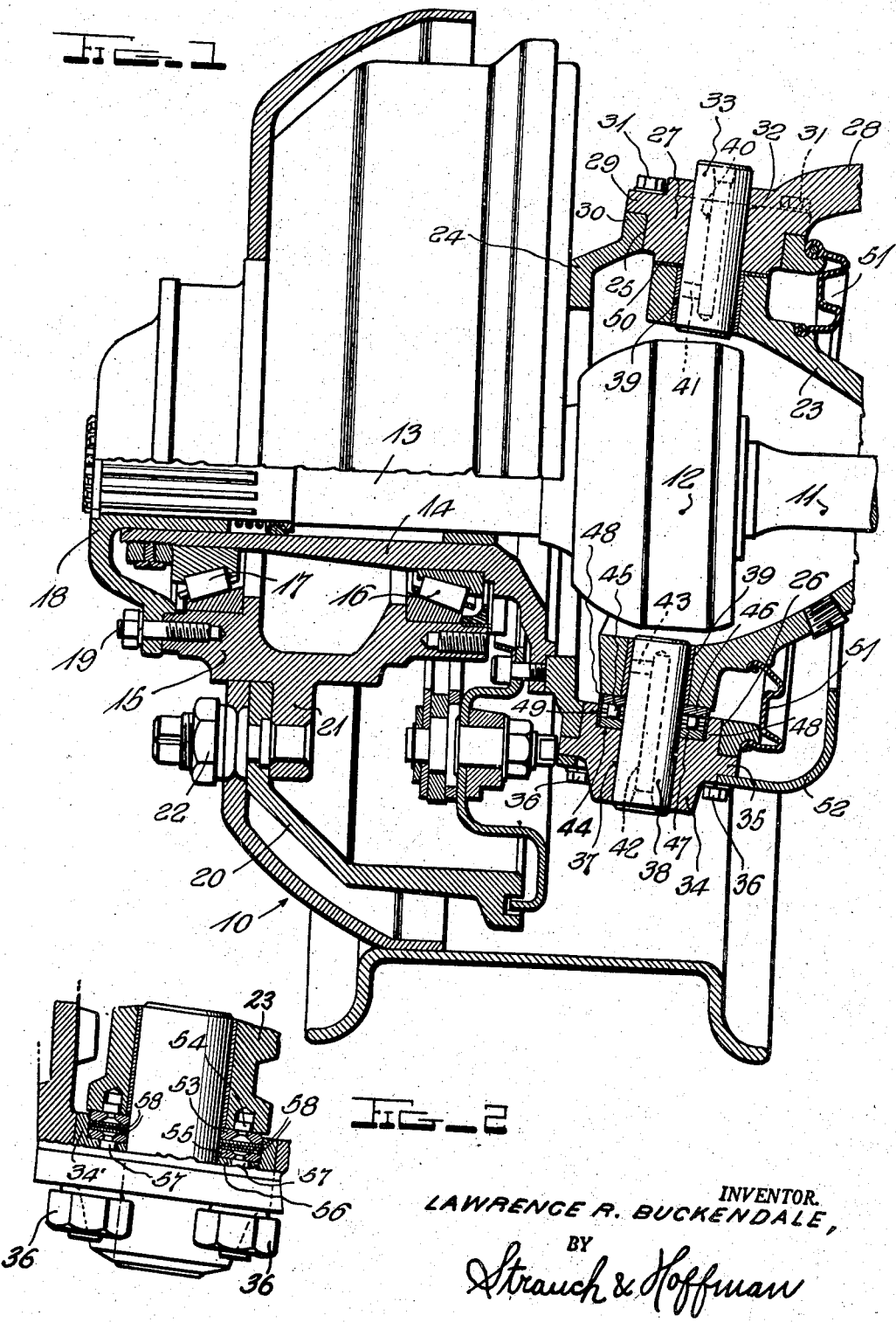

2,421,007

UNITED STATES PATENT OFFICE 2,421,007

VEHICLE STEERING SPINDLE MOUNTING

Lawrence R. Buckendale, Detroit, Mich., assignor to The Timken-Detroit Axle Company, Detroit, Mich., a corporation of Ohio Application March 6, 1944, Serial No. 525,221

9 Claims. (Cl. 280—96.1)

This invention relates to a vehicle steering spindle mounting and in part, constitutes a continuation-in-part of my pending application for patent on Drive axles, filed January 6, 1943, Serial No. 471,494, which issued January 15, 1946, as United States Letters Patent No. 2,392,832.

In the above application I have disclosed front and rear wheel supporting spindles having wheel hub receiving portions which are structural counterparts of each other, so that the front and rear wheel hubs may be interchangeably mounted thereon. These wheel supporting spindles are of conventional type, and are required for the interchangeable mounting of the wheel hubs. The front steering spindle is mounted upon the end of the front axle casing by trunnion assemblies which permit of the angular steering movements of said spindle relative to the axle casing. Such trunnion assemblies as heretofore proposed are provided with anti-friction bearings and are of comparatively large size so that their use in connection with a conventional spindle structure is impracticable.

It is, therefore, one of the important objects of this invention to provide a trunnion assembly and mounting for the front steering spindle which permits the use of a conventional type of steering spindle which is identical as to its wheel hub receiving portion with the fixed rear wheel spindle, so that the front and rear hubs may be interchangeably mounted on said spindles. To the above end I employ a steering wheel spindle trunnion assembly and mounting of the inverted Elliott type and it is a major object of the present invention to provide an improved means for rigidly connecting one end of the trunnion to the spindle whereby the other end of said trunnion may be mounted in a plain bearing on the axle casing.

Another object of the invention resides in the provision of a trunnion support detachably fixed to the spindle and having a smooth walled bore to receive a pre-shrunk trunnion pin. Thus, when the temperatures of the support and pin equalize and the pin expands, it will be frictionally locked to the wall of the bore, without the aid of other mechanical means.

A further object of the invention is to provide a trunnion pin having an extensive section thereof rigidly locked in the support and adequate to take care of all shearing stresses, so that the inner end of the pin may be journalled in a plain bearing on the axle casing.

It is a still further object of the invention to provide a simple and efficiently operating type of thrust bearing for the lower trunnion assembly to take care of the thrust load and facilitate the easy turning or steering movement of the wheel spindle relative to the axle casing.

It is also the general aim and purpose of my present invention to provide a compact trunnion assembly and mounting of comparatively small size which may be advantageously used in connection with the conventional type steering spindle, in cases where the front vehicle axle is stationary as well as when said axle and front wheels are also driven by the vehicle motor.

Other subordinate objects of the present invention will become apparent from the following description and the appended claims when considered in connection with the accompanying drawings, in which:

Figure 1 is a vertical sectional view of one end of a front vehicle axle casing showing one of the front wheels mounted upon a conventional steering spindle which is provided with my improved trunnion construction and mounting; and, Figure 2 is a similar fragmentary sectional view of the lower trunnion assembly showing an alternative form of thrust bearing.

With further reference to the drawings in which similar parts have been designated by corresponding reference characters, I have illustrated my invention as applied to the driven type of vehicle steering wheel, in which power is transmitted to the wheel assembly 10 from motor driven front axle 11 through the universal joint 12 to the stub shaft 13. This stub shaft extends through a conventional type of tubular spindle 14 which has a wheel supporting portion of identically the same external contour as the rigid non-steering supporting spindle for the rear vehicle wheel so that the wheel carrying hub may be interchangeably mounted on said spindles. Since the interchangeable wheel hubs are fully described in my pending application above-identified, for the purposes of this explanation it will suffice to state that the wheel hub 15 is rotatably supported on the spindle 14 by the outer and inner anti-friction bearings 16 and 17, respectively, and is connected with the stub shaft 13 by the cap member 18 splined upon the end of said shaft and having an annular flange securely bolted to one end of the hub 15 as shown at 19. The wheel assembly 10, together with the brake drum 20, is secured to either side face of the hub flange 21 by a plurality of stud bolts 22.

The end of the axle casing enclosing the front axle 11 is of enlarged semi-spherical form as indicated at 23 to provide a housing for the universal joint 12. The inner end of the spindle 14 is also provided with an enlarged housing section 24 of generally cylindrical form and within which the end of the housing portion 23 of the axle casing is received. The spindle housing section 24 is mounted upon the housing 23 of the axle casing for turning or pivoting movement about a vertically oblique axis which intersects the pivotal center of the universal joint 12, by means of my novel trunnion assemblies which will now be described.

The housing 24 is provided at the top and bottom thereof with the aligned openings 25 and 26, respectively. In the upper opening 25 a trunnion support 27 is tightly fitted and may be formed with the steering arm 28. The support 27 has a flange 29 to seat against the boss 30 on the wall of the housing 24 to which said support is detachably secured by a plurality of screws 31.

The support 27 has a smooth walled cylindrical bore 32 which provides a comparatively long bearing surface in which a hardened pre-shrunk trunnion pin 33 is fitted. The frictional fit between the periphery of the pin and the wall of the bore is preferably so great that it is unnecessary to employ a key or other mechanical means for rigidly securing the trunnion pin in the support 27. Preferably, I obtain this desired rigidity in the mounting of the trunnion pin 33 in the support by first freezing the pin 33 in dry ice, or other refrigerant medium, to cause it to contract. The bore of the support 27 is of such diameter that the contracted pin when inserted has a sliding fit therein. When the temperatures are permitted to normalize, the pin 33 will expand, and thereby become permanently and rigidly locked to the wall of the bore in support 27. It will be noted that this substantially integral connection between the pin and its support is circumferentially continuous over an extensive axial section of the pin, thus distributing the shearing stresses more or less uniformly along the pin so that adequate resistance to such stresses will be assured.

A trunnion support 34 is also fitted within the lower opening 26 in the wall of the housing 24 and is provided with a flange 35 which is detachably secured to the housing wall by the screws 36. Support 34 also has a central bore 37 in which the lower trunnion pin 38 is rigidly fixed in the manner above described.

The end of the axle housing 23 is provided with upper and lower aligned bores in which plain bearing bushings 39 are fitted. The inner ends of the trunnion pins 33 and 38 are respectively journalled in the bearing bushings 39. It will be noted that the part of each trunnion pin which is fixed in the supports 27 and 34, respectively, is of greater axial length than the journalled part of the pin mounted in the bushing 39. Therefore, while adequately taking care of the shear loads with a trunnion pin of uniform diameter throughout its length, I avoid the use of the relatively expensive ball or tapered roller bearings in the axle housing 23. By the use of the plain bearing, parts of relatively small size may be used and the trunnion pin assembly is greatly simplified. Thus, an inverted Elliott trunnion assembly of sufficiently small size may be employed so that it becomes possible to use a conventional type steering spindle corresponding to the fixed rear wheel spindle, whereby the same wheel hub may be interchangeably mounted upon the front and rear spindles.

The upper trunnion pin 33 is provided with an axial bore 40 having a tapped open end to which a lubricant fitting of conventional type may be connected for supplying lubricant to said bore. The inner end of this lubricant receiving bore communicates with the radial passage 41 through which the lubricant is supplied to the peripheral surface of the trunnion pin journalled in the bushing 39.

The lower trunnion pin 38 is likewise provided with a similar lubricant receiving bore 42 and radial passage 43 at its inner end through which lubricant is supplied to the surface of said pin journalled in the lower bushing 39.

The lower trunnion pin support 34 at the inner end of its bore 37 is counterbored as at 44 to receive a thrust bearing. In Figure 1 I have shown a thrust bearing of the anti-friction, ball or roller type, in which the anti-friction elements 45 are arranged between and cooperate with the upper and lower race rings 46 and 47, respectively. The bearing elements are maintained in properly assembled relation by a suitable retainer 48 which seats against the flat face 49 of the boss on the housing wall 23 in which the trunnion pin bushing 39 is mounted, and closely abuts the outer end of said bushing.

If, in assembling the several parts above described, an excessive clearance exists between the upper bearing boss on the wall of the axle housing 23 and the opposed trunnion pin support 27, one or more shims, indicated at 50, may be inserted to reduce this clearance and thus limit relative movement between the parts axially of the trunnion pins.

In order to exclude the entrance of extraneous matter, a flexible sealing boot 51 is suitably attached at its outer edge to the inner end of the spindle housing 24 and at its inner edge to the axle housing 23. To protect this boot against possible injury, a metal guard or shield 52 therefor may be attached to the flange 35 of the lower trunnion support 34 by the securing screws 36 for said support.

In Figure 2 of the drawings I have shown a simplified form of thrust bearing associated with the lower trunnion pin which has been found entirely practical for use in connection with my improved trunnion pin and support assembly. In the illustrated embodiment of this thrust bearing, a hardened steel thrust washer or ring 53 is rigidly fixed to the end face of the bearing boss on the wall of axle housing 23 by a plurality of rivet studs or pins 54, in abutting contact with the outer end of bushing 39. A similar hardened steel washer 55 is positioned in the recess or counterbore 56 of the trunnion pin support 34' and rigidly fixed to said support by rivet studs or pins 57. Between these thrust receiving washers 53 and 55, a plurality of thin hardened steel bearing rings 58 are interposed. Upon these superimposed bearing plates 58 substantially the entire thrust load will be imposed. As some of the lubricant supplied to the lower trunnion pin bushing 39 will find its way to the thrust bearing plates, excessive wear thereof is avoided. However, if after prolonged use, inadequate resistance to thrust load is indicated, screws 36 may be removed and the trunnion pin support 34' detached from the spindle housing 24, and the worn thrust bearing plates 58 replaced at nominal expense.

From the above description it will be apparent that I have provided a very simple, practical, efficiently operating and ruggedly constructed trunnion assembly in an inverted Elliott type steering spindle mounting. By the use of the upper and lower hardened trunnion pins of the same length and uniform diameter and rigidly locking the same in their supports, in the manner above described, difficult and costly machining operations are avoided. These novel trunnion pin and support assemblies with the use of plain bearings in the axle housing permit the use of parts of comparatively small size with extremely close coupling thereof with the steering spindle, so that front and rear spindles of conventional form may be employed for the interchangeable mounting of front and rear wheel hubs. Also, as high unit shearing stresses in the trunnion pins are avoided, permitting the use of plain bearings in the axle housing, this housing may be made of an inexpensive metal instead of the usual expensive alloy housing metal heretofore used, and with equal load carrying capacity and durability. The elimination of the usual ball or roller type bearings in the axle casing results in a further material reduction in production cost, and in view of the very simple structural form of the trunnion pins and associated parts, it will be evident that maintenance expense will be negligible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a vehicle axle housing provided in one end thereof with diametrically aligned upper and lower trunnion pin receiving openings, bearing sleeves lining said openings, a steering wheel spindle, diametrically opposed trunnion pin supports rigidly mounted on the inner end of said spindle and positioned at the outer side of the axle housing, an elongated trunnion pin having the major portion thereof rigidly fixed in each of said supports, said trunnion pins being of substantially equal length and of the same uniform diameter and each having a minor cylindrical end portion thereof journalled by means of one of said sleeves in one of said openings in the axle housing, and a thrust bearing between said axle housing and the lower trunnion pin support.

2. In combination with a vehicle axle housing provided in one end thereof with diametrically aligned trunnion pin receiving openings, a steering wheel spindle having a housing member on its inner end fitted over said end of the axle housing, plain bearing bushings in said axle housing openings, a pair of trunnion supports, means for detachably securing said supports to the wall of said spindle housing member in diametrically opposed relation to each other, trunnion pins of corresponding structural form and dimensions respectively fixed in said supports and having inner end portions journalled in said bearing bushings, and a thrust bearing interposed between said axle housing and one of said trunnion pin supports.

3. In combination with a vehicle axle housing member and a steering wheel spindle having a housing member on its inner end, one of said housing members fitting within the other, upper and lower trunnion pin assemblies, means for detachably and rigidly mounting said assemblies on the outer housing member with the trunnion pins in diametrically opposed, axially aligned relation, said inner housing member having diametrically opposed openings in the wall thereof and a plain bearing bushing in each of said openings, in which the inner end of one of the trunnion pins is journalled, and a thrust bearing unit associated with the lower trunnion pin assembly and detachable therewith from its operative position with respect to said housing members.

4. In a steer drive vehicle axle, an axle housing having an enlarged end portion provided with diametrically opposed trunnion pin receiving openings, a steering wheel spindle, rigid diametrically opposed trunnion pin supports on the inner end of said spindle and positioned at the outer side of said axle housing, inwardly projecting trunnion pins fixed to said supports and having cylindrical bearing surfaces, plain bearing bushings within said trunnion receiving openings surrounding said bearing surfaces, and a thrust bearing mounted between the support for the lower trunnion pin and the outer side of said housing and surrounding the lower trunnion pin.

5. In combination with a vehicle axle housing provided in one end thereof with diametrically aligned upper and lower trunnion pin receiving openings, bearing sleeves lining said openings, a steering wheel spindle, diametrically opposed trunnion pin supports rigidly mounted on the inner end of said spindle and positioned at the outer side of said axle housing, and an elongated cylindrical hardened metal trunnion pin having an uninterrupted smooth peripheral surface of uniform diameter frictionally non-rotatably locked in matching bores in each one of said supports at its outer end and journaled at its inner end in said bearing sleeves.

6. In a steer drive axle assembly, an axle housing formed with axially aligned upper and lower bores having their common axis at a slight angle to the vertical plane of the wheel supporting said axle assembly, bearing sleeves lining said bores, a wheel supported spindle having an inner part extending over said axle housing formed with cylindrical bores each adjacent and axially aligned with one of said bores on the axle housing, and elongated cylindrical trunnion pins of such length as to extend through each adjacent pair of bores, each pin having a major portion of its length non-rotatably tight within the bore in said spindle part so as to distribute shear stresses uniformly along said pin and having an appreciable but minor portion of its length journaled in one of said bearing sleeves.

7. In combination with a vehicle axle housing provided in one end thereof with diametrically aligned trunnion pin receiving openings, a steering wheel spindle having a housing member on its inner end fitted over said end of the axle housing, plain bearing bushings in said axle housing openings, a pair of trunnion supports, means for detachably securing said supports to the wall of said spindle housing member in diametrically opposed relation to each other, trunnion pins of corresponding structural form and dimensions respectively fixed in said supports and having inner end portions journalled in said bearing bushings, means forming an inner end recess in one of said trunnion pin supports, and a thrust bearing positioned in said recess in closely abutting relation with the outer end of the associated bearing bushing for said trunnion pin.

8. In combination with a vehicle axle housing provided in one end thereof with diametrically aligned trunnion pin receiving openings, a steering wheel spindle having a housing member on its inner end fitted over said end of the axle housing, plain bearing bushings in said axle housing openings, a pair of trunnion supports, means for detachably securing said supports to the wall of said spindle housing member in diametrically opposed relation to each other, trunnion pins of corresponding structural form and dimensions respectively fixed in said supports and having inner end portions journalled in said bearing bushings, and a thrust bearing unit associated with one of the trunnion pins comprising hardened metal washers surrounding the pin and secured, respectively, to an inner end face of the pin support and to an opposed face on the axle housing, and a plurality of superimposed, relatively thin, annular thrust receiving disks interposed between said washers.

9. In a vehicle axle assembly, a wheel supported spindle having upper and lower aligned trunnion pins rigid therewith and projecting inwardly toward each other, an axle housing journaled on said trunnions, and a thrust bearing assembly between the lower portions of said housing and spindle comprising hardened metal annular members secured respectively to said housing and said spindle and formed with opposing flat surfaces surrounding the lower trunnion pin, and a plurality of superimposed free thin flat annular members surrounding said lower trunnion pin between said flat surfaces.

LAWRENCE R. BUCKENDALE.

REFERENCES CITED

The following references are of record in the file of this patent:

UNITED STATES PATENTS

| Number | Name | Date |
|---|---|---|
| 2,042,404 | Keese | May 26, 1936 |
| 1,491,988 | Holmes | Apr. 29, 1924 |
| 1,995,987 | Keese | Mar. 26, 1935 |
| 2,075,564 | Alden | Mar. 30, 1937 |
| 2,333,911 | Alden | Nov. 9, 1943 |
| 1,983,533 | Brown | Dec. 11, 1934 |
| 1,211,151 | Hewitt | Jan. 2, 1917 |
| 1,922,962 | Lambert | Aug. 15, 1933 |